United States Patent [19]

Weaver et al.

[11] Patent Number: 5,308,048
[45] Date of Patent: May 3, 1994

[54] FRONT SUSPENSION STRUT UPPER MOUNT

[75] Inventors: Michael S. Weaver, Madison Heights; Donald A. Spravsow, Sterling Heights; Robert L. Carter, Gibraltar, all of Mich.

[73] Assignee: Chrysler Corporation, Highland Park, Mich.

[21] Appl. No.: 129,478

[22] Filed: Sep. 30, 1993

[51] Int. Cl.⁵ .................................. B60G 13/00
[52] U.S. Cl. ........................... 267/220; 267/33; 267/293; 267/153; 267/141.1; 280/668
[58] Field of Search .............. 267/220, 219, 33, 140.3, 267/141, 141.1, 141.3, 141.4, 153, 152, 292, 293, 294; 280/668, 96.1, 716, 710; 188/321.11

[56] References Cited

U.S. PATENT DOCUMENTS

| | | | |
|---|---|---|---|
| 4,248,454 | 2/1981 | Cotter et al. | 280/668 |
| 4,274,655 | 6/1981 | Lederman | 280/688 |
| 4,465,296 | 8/1984 | Shiratori et al. | 280/668 |
| 4,478,396 | 10/1984 | Kawaura | 267/8 R |
| 4,747,587 | 5/1988 | Ferrel | 267/220 |
| 4,805,886 | 2/1989 | Hassan | 267/220 |
| 4,934,730 | 6/1990 | Okuzumi | 280/668 |
| 5,078,370 | 1/1992 | McClellan | 267/220 |
| 5,248,134 | 9/1993 | Ferguson et al. | 267/220 |

*Primary Examiner*—Douglas C. Butler
*Attorney, Agent, or Firm*—Edward P. Barthel

[57] ABSTRACT

An automotive suspension strut upper mounting assembly providing increased stroke length and enhanced spring rate tunability with the major working area of the mount being located above the body panel attachment surface. The mount comprises a housing including upper and lower closures readily assembled to enclose a composite isolator mount comprising an inner metal cup bonded to an outer elastomeric ring. The composite ring has a concentric sleeve embedded therein defining inner and outer body portions providing an increased spring rate for stiffening lateral vehicle motion caused by handling maneuvers. The inner and outer body portions are each formed with a pair of diametrically opposed fore and aft voids selectively reducing the spring rate thereby softening longitudinally imposed impact loads.

7 Claims, 2 Drawing Sheets

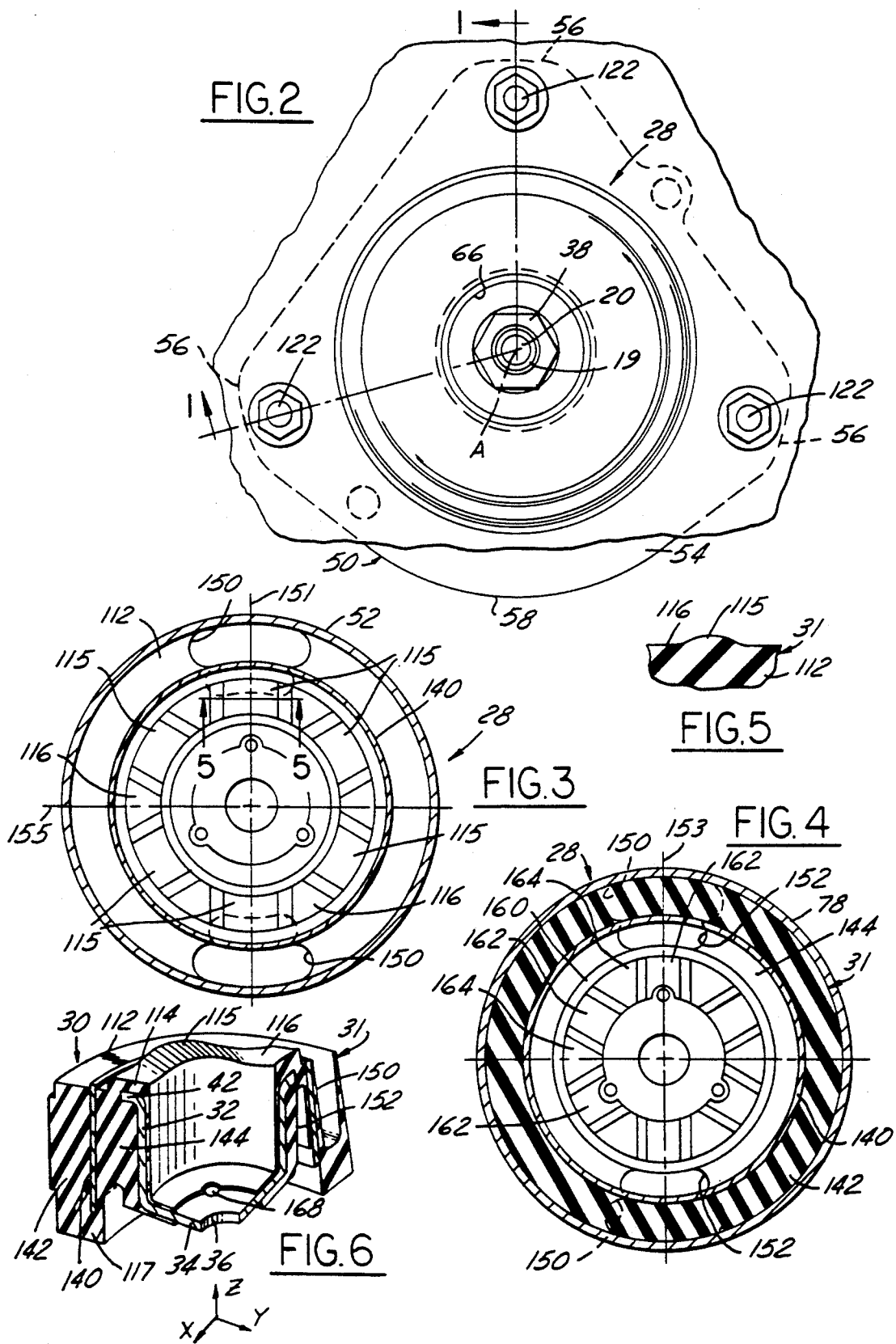

FRONT SUSPENSION STRUT UPPER MOUNT

BACKGROUND OF THE INVENTION

This invention relates to automotive suspensions and, more particularly, to an improved upper mount for hydraulic suspension shock absorbers providing a single unit arrangement for vehicle assembly line installation together with integrated jounce and rebound stops together and increased stroke length.

An example of one low profile suspension strut is found in U.S. Pat. No. 4,747,587 issued May 31, 1988 to Farrell and assigned to the assignee of the present application. The Farrell patent disclosed a strut isolator and jounce bumper upper mount providing a compact resilient assembly adaptable for a vehicle having a reduced hood line.

The U.S. Pat. No. 5,078,370 issued Jan. 7, 1992 to McClellan is an example of a vehicle front suspension strut having integrated jounce and rebound stops. In the McClellan patent, the suspension spring rebound load is placed on a lower rebound stop member of the mount and the suspension jounce load is placed on an upper jounce stop member of the mount.

The U.S. Pat. No. 4,934,730 issued Jun. 19, 1990 to Okuzumi is an example of a vehicle front suspension strut wherein the upper end of the strut piston rod is engaged in an inner sleeve of a mount insulator for limited axial movement relative to the inner sleeve.

The U.S. Pat. No. 4,274,655 issued Jun. 23, 1981 to Lederman discloses a resilient mount for a MacPherson strut comprising an annular mounting plate, an elastomeric ring, a central sleeve with an attached end plate, and a ball thrust bearing. The mounting plate, central sleeve and the upper bearing ring of the thrust bearing are bonded to the elastomeric ring forming a sub-assembly. The mounting plate has a central cup-shaped portion which is embedded in the elastomeric ring and trapped between an enlarged head of the sleeve and the end plate. The elastomeric ring has integral flexible sealing lips at its lower end which retain the bearing elements and lower ring.

SUMMARY OF THE INVENTION

It is an object of the present invention to provide an improved upper strut mounting assembly for a vehicle suspension wherein a composite elastomeric ring and metal cup mount is enclosed in a two piece housing such that the major working area of the mount is located above the shock tower attachment surface for increased strut length.

It is another object of the present invention to provide an improved vehicle suspension upper strut mounting assembly which provides a maximum volume of elastomeric material in a minimal envelope for improved noise isolation.

It is still another object of the invention to provide a vehicle suspension upper strut mounting assembly having a composite strut mount which uniquely combines both a reduced spring rate for softening longitudinally imposed impact loads together with an increased spring rate for stiffening lateral vehicle motion resulting from vehicle handling maneuvers.

It is a further object of the present invention to provide an improved upper mount assembly for a vehicle suspension strut wherein a reduced number of components are required achieving a unitary assembly for ready installation on a vehicle assembly line.

These and other objects and advantages of the present invention will be readily apparent by reference to the following description of the preferred embodiment and the accompanying drawing which shows, mostly in cross section, a vehicle suspension strut incorporating the improved upper mount.

BRIEF DESCRIPTION OF THE DRAWINGS

FIG. 2 is a detail top view of the strut upper mount of FIG. 1 prior to attachment to a strut tower;

FIG. 3 is a horizontal cross sectional view, partly in elevation, taken on the line 3—3 of FIG. 1;

FIG. 4 is a horizontal cross sectional view, partly in elevation, taken on the line 4—4 of FIG. 1;

FIG. 5 is a fragmentary vertical cross sectional view taken on the line 5—5 of FIG. 3;

FIG. 6 is a fragmentary partially cut-away perspective view of the composite isolator block of FIG. 1.

DETAILED DESCRIPTION OF THE INVENTION

Figure 1:
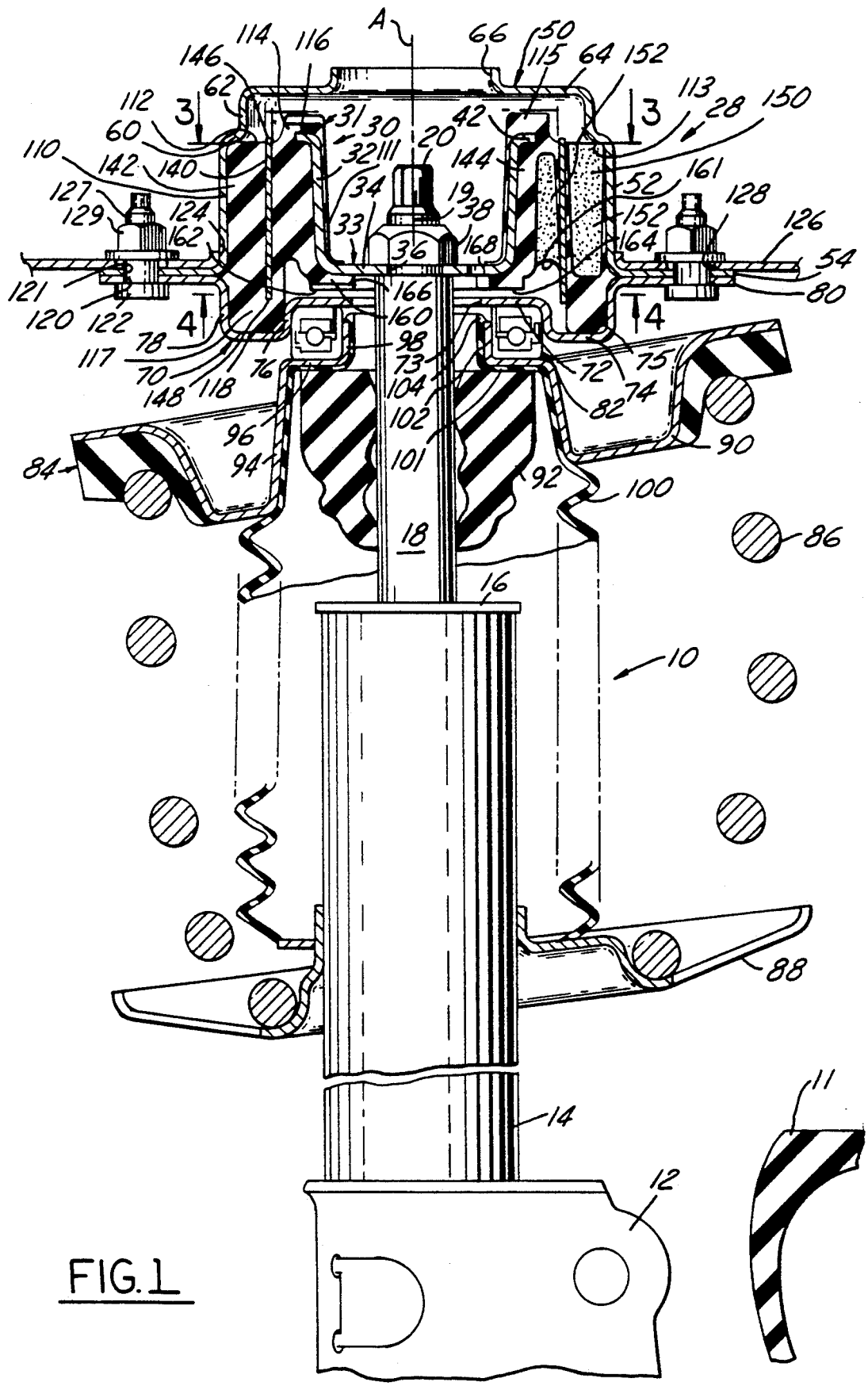
FIG. 1 is a fragmentary front view, partly in elevation, of a suspension strut fixedly attached to a strut tower with the upper mount of the present invention having its right-half shown in vertical cross section taken on a fore-aft line 1-A and its left-hand shown in vertical cross section taken on a diagonal line A-1 wherein the strut is fixedly attached in a strut tower.

Referring now to the drawing, there is shown in FIG. 1 a portion of a vehicle front suspension having a hydraulic shock absorbing damper strut 10 interconnecting the vehicle's sprung mass with the vehicle's unsprung mass supported by a front wheel partially indicated at 11. The damper strut 10 comprises a lower mounting bracket 12 connected to a wheel steering knuckle (not shown). The mounting bracket 12 provides a lower attachment for outer cylindrical strut support tube 14. The support tube 14 is suitably secured as by welding in the lower bracket 12 and extends upwardly therefrom. The upper end of the support tube 14 is closed by upper cap 16, welded or otherwise secured to the support tube. Reference may be had to the U.S. Pat. No. 5,078,370, mentioned above, which patent discloses details of conventional shock absorber components and is incorporated by reference herein.

A cylindrical piston rod 18 extends axially upwardly from a conventional valved piston (not shown) slidably mounted in a cylindrical inner tube (not shown) radially spaced inwardly from the support tube 14 which provides a reservoir for the strut hydraulic dampening fluid. The piston rod 18 has a reduced diameter upper threaded portion 19 terminating in an upper hex end 20. The piston rod is removably attached to a shock upper mounting assembly, generally indicated at 28, which is the subject of the present invention.

As seen in FIG. 1, the mounting assembly 28 comprises an outer two-part housing defined by an upper closure 50 an a lower closure 70 both formed from sheet metal. The two-part closure houses a composite isolator mount, generally indicated at 30, comprising an elastomeric ring 31 concentrically surrounding an upstanding side wall 32 of a cylindrical inner mounting cup 33. The cup 33, which is stamped from sheet metal, is positioned in a concentrically disposed manner about the strut principle axis "A". The cup has a closed radially extending bottom wall 34 defining upper and lower planer surfaces. The cup bottom wall 34 is formed with a central hole 36 having its center aligned on the axis "A" so as to receive therethrough the piston rod upper threaded portion 19 for threaded attachment by nut 38. The cup 33 has an inner side wall 32 shown diverging upwardly and outwardly from the vertical at a slight acute angle of the order of three degrees. The cup side wall 32 terminates at its upper end in jounce stop means in the form of an annular radially outwardly extending positive stop flange 42.

The upper generally hat-shaped closure member 50 has a cylindrical upstanding outer wall portion 52, disposed concentrically about strut axis "A", terminating at its lower end in a radial outward flanged brim 54. As seen in the top view of FIG. 2, the flanged brim 54 has a generally quadrilateral-shaped outer periphery defining in plan view three relatively chamfered intersections 56 and a remaining relatively large radiused intersection 58.

The upper closure member 50 is formed with an upper reduced diameter cap portion defined by a radial inward annular stepped shoulder 60 and an upwardly extending cylindrical riser 62. The cap portion riser terminates in an upper radial inward top web 64 having a central upstanding flanged access aperture 66 the diameter of which is substantially equal to the diameter of the cup bottom wall 34.

The lower closure member 70, concentrically disposed about the axis "A" and formed of sheet metal, has a circular radially extending central disc 72 provided with a central opening 73 through which the piston rod upper reduced end extends. The disc 72 terminates at its outer periphery in a countersunk U-sectional channel continuously defining a socket having a radially extending annular base 74 having an upper surface 75. The channel base 74 has an axially upwardly disposed cylindrical inner channel wall 76, having a first axial dimension, and an axially upwardly disposed cylindrical outer channel wall 78, having a second axial dimension. It will be noted in the preferred embodiment the axial dimension of the inner channel wall 76 is substantially one-half the axial dimension of the outer channel wall 78. It will also be seen that the outer channel wall 78 has an internal diameter equal to the internal diameter of the upper closure member outer wall 52.

FIG. 1 depicts the outer channel wall 78 formed at its upper end with a radially outwardly extending terminal flange 80 adapted for flatwise or flush seating contact with the undersurface of the upper closure member flanged brim 54. Thus, the assembled closure members 50 and 70 define the two-part housing adapted to enclose the composite isolator mount 31 in a manner to be explained. The lower closure member disc 72 together with its inner channel wall 76 define an annular downwardly facing cavity sized to snugly receive therein a circular ball bearing ring assembly 82.

An upper annular spring seat assembly 84 is resiliently supported on the upper coil of an helical suspension spring generally indicated at 86. The suspension spring 86 spirals around the strut outer support casing 14 and extends upwardly from an annular lower spring support member 88 which is secured as by welding to the support casing 14 above the mounting bracket 12.

The upper spring seat assembly 84 comprises a sheet metal trough 90 concentrically surrounding an elastomeric jounce bumper 92. The bumper 92 has a central hole receiving, in a press fitting manner, an upper portion of the piston rod 18. Inner trough wall 94 of the upper spring seat terminates at its upper end in an L-shaped annular flange providing a radially inwardly extending shelf portion 96 and an axially upstanding riser portion 98. The L-shaped annular flange is sized to support a circular ball bearing ring assembly 82. A dust tube 100, made of suitable elastomeric or plastic material, has its upper end formed with a right angle bend defining a radial inward extending portion 101 and an upright cylindrical portion 102. The upright portion 102 has its upper end formed with a retaining detent 104 which snap-fits over the upper edge of the riser portion 98.

The composite isolator mounting 31 is molded of suitable deformable elastomeric material such as natural or synthetic rubber. The ring 31 concentrically surrounds and is axially coextensive with the cup side wall 32. The cup side wall outer surface is bonded to the ring inner periphery while the cup wall inner surface has bonded thereto an integral protective elastomeric skin portion 111 of the ring. The cup defines an axial chamber having a minimal diameter substantially equal to the cap access flanged opening 66.

The ring 31 has a cylindrical outer surface 110 of predetermined diameter such that it is adapted to be received in a radial press-fit manner in the upper closure member 52. It will be noted in FIG. 1 that the ring 31 has a radially extending outer peripheral upper end face 112 adapted to seat against the inner surface of the upper closure member stepped shoulder 60. It will also be seen that the ring has its upper radially inner periphery defining a raised upper jounce collar 114 in which the cup jounce stop flange 42 is embedded. The jounce collar 114 has its upper annular surface formed with a continuous sinuous series of undulating rounded lugs 115 and valleys 116 adapted to engage the opposed undersurface of the upper closure member cap circular web 64. It will be appreciated that the series of lugs 115 may be varied in height and/or number to tune the jounce spring rate of the shock mounting assembly. Also, the jounce collar 114 upper end could be planer for flush abutting resilient contact with the undersurface of the cap circular web 64 upon the shock piston rod 18 achieving a predetermined axial jounce travel or upward stroke. The jounce spring rate may be further tuned by varying the axial dimension of the jounce collar and or the elastomeric material elastic index.

The isolator ring 31 is integrally formed with an axially depending concentrically disposed tubular extension 117 having a radial extent which mirrors in a complementary manner the radial extent of the top end face 112. The tubular extension 117 is sized and configured for press-fit insertion in the lower closure member annular channel such that its free end 118 seats on the channel base upper surface 75. It will be noted that the tubular extension 117 has a predetermined outer diameter equal to the outer diameter of the ring 31.

The external axial dimension between the ring upper end face 112 and the tubular extension free end 118 exceeds by a predetermined dimension the internal axial dimension between the inner surface 113 of the stop shoulder 60 and the upper surface 75 of the channel base 74. The composite mount 30 is assembled by inserting the ring 32 in a press-fit conforming manner in the upper closure member with its upper end face 112 contacting the shoulder internal surface 113.

Next, the lower closure member channel is fitted on a depending tubular extension 117 of the ring 31 with the channel base internal surface contacting the free end 118 of the tubular extension. It will be appreciated that the lower closure terminal flange 80 is positioned in flatwise contact with the upper closure brim flange 54 its pre-punched or drilled holes 120 are aligned with matching holes 121 in the upper closure brim flange 54. Each pair of holes 120 and 121 is sized for the pressed-fit reception of the unthreaded portion of a stake screw 122. Each of the stake screws 122 is installed by an automatic staking operation which axially upsets the screw unthreaded length fixedly clamping the flanges 54 and 80 without creating weld splatter, a common problem with weld screws. After the staking operation, wherein the upper and lower attached closures apply an axial pre-load on the composite mount ring 31, the mount assembly 28 is ready for shipment to a vehicle assembly plant.

The installer inserts the mounting assembly 28 in flanged aperture 124 of a vehicle sheet metal structural panel 126 which defines the upper end of a shock tower in the disclosed embodiment. Each stake screw threaded shank 127 is inserted through an associated oversize panel hole 128 and retained by tightening a nut 129 on the threaded shank 127.

As seen in FIGS. 1 and 3, an axially extending spring rate metal sleeve 140 is concentrically embedded in the elastomeric ring 31 such that the sleeve divides the ring into outer 142 and inner 144 ring body portions of substantially equal radial extent. It will be noted that the rate sleeve 140 has an upper circular edge 146 located slightly above the surface of the upper end face 112 while its lower circular edge 148 terminates axially intermediate the rebound collar and the tubular extension lower end face 118. The rate sleeve 140 functions to increase the mount spring rate for stiffening lateral motion resulting from vehicle handling maneuvers.

With reference to FIG. 1, it will be seen that the ring outer body portion 142 is formed with a plurality of axially extending exterior first blind voids 150 having their openings in the ring upper end face 122 and an axial extent substantially equal to the axial extent of the cup side wall 32. Further, the ring inner body portion 144 is formed with a plurality of axially extending second inner blind voids 152 having an axial extent slightly less than the axial extent of the first blind voids 150 and having their openings in the ring lower end face 161.

In the preferred form of the invention, FIGS. 3 and 6 show a first pair of diametrically opposed mirror image blind outer voids 150 provided in the ring outer body portion 142 disposed about a predetermined longitudinally extending vertical plane of symmetry which includes FIG. 3 construction line 151. A second pair of diametrically opposed mirror image blind voids 152 are shown disposed about the same vertical plane of symmetry defined by FIG. 4 construction line 153. By means of the outer pair of voids 150 and the inner pair of voids 152, the composite mount 30 is tuned to provide a predetermined reduced spring rate for softening longitudinally imposed impact loads occurring when the tires run through pot holes of other irregular road surfaces. It will thus be noted that applicants' unique mounting assembly is tuned to both increase its spring rate for stiffening lateral motion while selectively reducing the spring rate for softening impact loads imposed along the vehicle longitudinal axis "X" as indicated in FIG. 6. It will be seen in FIGS. 3 and 4 that each of the outer 150 and inner 152 pair of voids are axially elongated defining arcuately extending kidney-shaped mirror image voids when viewed in horizontal section. The composite mount ring 31 lower radially inner periphery defining a concave radial sectioned end face 161 terminating in an integral rebound collar 160. FIG. 1 shows the rebound collar 160 extending radially inward a predetermined extent for bonding to the underside of the cup bottom wall 34. It will be noted that the rebound collar 160 overlies the lower closure disc 72 and is vertically spaced a predetermined axial extent therefrom. With reference to FIG. 4, the rebound collar 160 has its lower annular surface formed with a continuous sinuous series of undulating rounded lugs 162 and valleys 164 adapted to contact the upper surface of the disc 72 during rebound. In a manner similar to the jounce collar lugs 115 of FIG. 5, the rebound collar series of lugs 162 may be varied in height and/or number to tune the rebound spring rate of the shock mount 30.

The rebound collar 160 has a central concentric opening 166 slightly larger than the disc central opening 73 for passage of the piston rod 18. A drain hole 168 is provided in the cup bottom wall 34.

While only two embodiments of the present invention have been described, other embodiments and modifications are possible without departing from the scope of the appended claims.

What is claimed is:

1. An upper mounting assembly for a suspension shock absorber strut operatively connected between sprung and unsprung masses of a vehicle about the principal axis of the strut, the strut provided with a piston rod adapted for reciprocal movement along the strut axis, the mounting assembly comprising:

a composite isolator mount comprising a central inner metal cup, an outer elastomeric ring and a metal spring rate sleeve, said cup has a bottom wall and an upstanding annular side wall of predetermined axial dimension substantially equal said ring whereby said side wall is concentrically surrounded by an bonded to an inner surface of said ring;

said ring having an upper radially outer upper periphery defining an annular end face and an upper inner periphery defining an annular raised jounce collar, said ring having a lower outer periphery formed with an integral concentrically depending tubular extension in axially opposed conformity with said upper annular end face, and said ring having a lower inner periphery formed with an integral radially inwardly extending rebound collar bonded to an underside of said cup bottom wall;

said cup bottom wall formed with a central hole adapted to receive therethrough the piston rod upper end for attachment to said cup, said cup side wall having an upper open end terminating in an annular radially outwardly extending stop flange embedded in said ring upper jounce collar;

said mounting assembly further comprising an outer housing concentrically disposed about the principal axis defined by upper and lower one piece metal closures, said upper closure having a cylindrical outer wall having a lower open end terminating in a radially outward flanged brim, said ring sized for reception in said upper closure so as to be surrounded in a radially press-fit manner by said outer wall, said outer wall terminating at its upper end by a radially inward internal stepped shoulder and an axially extending riser, said riser terminating in a radial inward cap web having a central access aperture therein;

said lower closure defined by a radial disposed circular disc bordered by a U-sectional channel having interior and exterior axially extending channel walls joined at their lower ends by a radial disposed bight wall, said exterior channel wall of a predetermined diameter equal to said upper closure outer wall and terminating at its upper end in a radial outward terminal flange, whereby said closures providing a housing for said composite mount upon an undersurface of said upper closure flanged brim secured in flatwise contact with an upper surface of said lower closure terminal flange;

said composite mount configured and sized such that upon being received in said upper and lower closure housing with said ring upper end face abutting said upper closure internal shoulder and said tubular extension press-fitted in said lower closure channel with a free lower end face of said tubular extension abutting said bight wall causing said composite mount to be resiliently compressed within said housing by means of a predetermined axial pre-load;

said jounce collar spaced a determined axial extent from an underside of said cap web and said rebound collar spaced a determined axial extent from an upper side of said disc with said piston rod in a predetermined neutral design state;

said spring rate sleeve concentrically embedded in said ring so as to divide said ring into radial outer and inner ring body portions of substantially equal radial extent; and wherein said outer body portion formed with a first pair of diametrically opposed axially extending blind voids having an opening in said ring upper end face, and said inner body portion formed with a second pair of diametrically opposed axially extending blind voids having an opening in said ring lower end face, whereby said mounting assembly provides selective spring rates for stiffening lateral vehicle motion while softening longitudinally imposed impact loads.

2. The mounting assembly as set forth in claim 1 wherein said sleeve having a predetermined axial extent such that an upper edge thereof terminates adjacent said ring upper end face and a lower edge thereof terminates within said tubular extension at a location axially intermediate said rebound collar and said extension lower end face.

3. The mounting assembly as set forth in claim 2 wherein said first pair of voids having an axial extent substantially equal to said cup side wall, and said second pair of voids having an axial extent slightly less than said first blind voids.

4. The mounting assembly as set forth in claim 3 wherein each said first pair of voids having a predetermined arcuately elongated shape in horizontal section and said second pair of voids having a predetermined arcuately elongated shape in horizontal section.

5. The mounting assembly as set forth in claim 1 wherein said jounce collar having an upwardly facing annular surface formed with a continuous series of scalloped peaks and valleys.

6. The mounting assembly a set forth in claim 1 wherein said rebound collar having a downwardly facing annular surface formed with a continuous series of scalloped peaks and valleys.

7. The mounting assembly as set forth in claim 1 wherein said lower closure member inner channel wall having an axial extent about one-half the axial extent of said outer channel wall.

* * * * *